United States Patent [19]

Kara

[11] Patent Number: 5,802,175
[45] Date of Patent: Sep. 1, 1998

[54] COMPUTER FILE BACKUP ENCRYPTION SYSTEM AND METHOD

[76] Inventor: Salim G. Kara, 17 Bayview Forest Lane, Markham, Ontario, Canada, L3T7S4

[21] Appl. No.: 718,154

[22] Filed: Sep. 18, 1996

[51] Int. Cl.⁶ .................. H04L 9/08; H04L 9/00
[52] U.S. Cl. .................. 380/21; 380/4; 380/9; 380/44; 380/46; 380/49; 380/50
[58] Field of Search .................. 380/4, 9, 21, 44, 380/45, 46, 47, 49, 50, 59, 16

[56] References Cited

U.S. PATENT DOCUMENTS

| | | | |
|---|---|---|---|
| 4,450,535 | 5/1984 | De Pommery et al. | 380/25 X |
| 4,757,532 | 7/1988 | Gilham | 380/23 |
| 4,961,142 | 10/1990 | Elliott et al. | 380/24 X |
| 5,008,936 | 4/1991 | Hamilton et al. | 380/50 |
| 5,111,504 | 5/1992 | Esserman et al. | 380/21 |
| 5,131,040 | 7/1992 | Knapczyk | 380/50 |
| 5,265,164 | 11/1993 | Matyas et al. | 380/30 |
| 5,363,447 | 11/1994 | Rager et al. | 380/21 |
| 5,392,351 | 2/1995 | Hasebe et al. | 380/4 |
| 5,416,840 | 5/1995 | Cane et al. | 380/4 |
| 5,604,801 | 2/1997 | Dolan et al. | 380/21 |
| 5,675,649 | 10/1997 | Brennan et al. | 380/21 |

*Primary Examiner*—Bernarr E. Gregory
*Attorney, Agent, or Firm*—Fulbright & Jaworski L.L.P.

[57] ABSTRACT

A system and method for generating, storing and retrieving cryptographic keys to be utilized in a processor-based system. In one embodiment, a Touch Memory ("TM") containing unique information is used as a portable memory to interface with a processor-based system wherein a cryptographic key generation program utilizes the unique information in the generation of cryptographic key sets. The generated encryption and decryption keys are stored on at least one such portable memory. Additionally, the encryption key is stored in the processor-based system. The presence of at least one specific portable memory is necessary at the time of decryption of data encrypted utilizing an encryption key associated with a decryption key, or portion thereof, stored on the specific portable memory.

31 Claims, 5 Drawing Sheets

COMPUTER FILE BACKUP ENCRYPTION SYSTEM AND METHOD

TECHNICAL FIELD OF THE INVENTION

This invention relates, in general, to the encryption and decryption of data in a computer system, and more specifically, to a system and method in which cryptographic key sets are generated from unique data supplied from a portable memory device and data supplied from a host computer system and, thereafter, the decryption key is stored only on the portable memory device, making such device necessary to decrypt any files encrypted using the corresponding encryption key.

BACKGROUND OF THE INVENTION

Presently, it is common for important or sensitive computer files to be encrypted to prevent their unauthorized access while being transmitted or stored. This is very convenient, since it is often desirable to relax physical control over sensitive information while maintaining controlled access to such information.

Specifically, one such situation involves the backing up and archiving of data files containing business information. Businesses often find it necessary to store voluminous amounts of computerized business records. Commercial services often provide off-site storage for such records. Once off-site, the business no longer has physical control over the information. Therefore, businesses often times will encrypt such files before transmitting them to off-site storage providers.

Data encryption algorithms are well known in the art. The Data Encryption Standard (DES) has been a world wide standard for encryption for many years. The American National Standards Institute ("ANSI") approved DES as a private-sector standard, designating it the ANSI X3.92 standard.

DES encryption can be expressed as the function $E_k(X)$ where X is the data to be encrypted and k is the key. Likewise, DES decryption can be expressed as the function $D_k(X)$, where X is the data to be decrypted and k is the key. The key k in both functions is a key reserved for secret key generation.

The use of public-key cryptography is well known in the art and utilizes two different keys: one public (encryption key) and the other private (decryption key). It is computationally unfeasible to deduce the decryption key from the encryption key. These keys may be expressed as k1 for encryption and k2 for decryption, and are related such that $D_{k2}(E_{k1}(X))=X$. In such a system anyone with the encryption key k1 can encrypt a message but not decrypt it. Only the person with the decryption key k2 can decrypt the message.

Methods of cryptographic key generation are also well known in the art. One such method is to randomly select a key of suitable attributes from the available spectrum of possible keys. In a processor-based system, because of the difficulty in generating a truly random sequence, oftentimes seed data is used in the generation of a pseudo random sequence. In such systems the generation of a key k may be expressed as k=R(S), where S is the seed data and R is a randomizer function.

In the business environment, the process of archiving of the records is generally the responsibility of a data system clerk whom, although entrusted with this vital business task, is not always entrusted with knowledge of the contents of the records. To provide security for the sensitive data, a public-key encryption system, as discussed above, may be utilized. With a public-key encryption system, the clerk can be provided an encryption key and limited access to the data, thus enabling this person to backup and encrypt the data, but not to browse it. Without the decryption key, the clerk is unable to decrypt the data outside the system and, therefore, is unable to avoid the limitations on access to the data provided by the system.

Furthermore, once the data is so encrypted, it is then safe for transmittal to and storage by a commercial storage provider. The result being that, although physical control over the information has been surrendered, controlled access has not been surrendered.

A weakness with this method of archiving data is that a decryption key must be generated and utilized in order to have any meaningful access to the archived data. To decrease the likelihood of any rogue discovering the decryption key, such keys are generated to result in a seemingly random and meaningless string of symbols. In addition to this string of symbols being very difficult to guess, it is also very difficult to commit to memory. Thus, the decryption key is generally stored in some sort of retrievable format to enable later decryption of the associated encrypted data. One of the most common locations for storage of the decryption key is on the computer system itself.

Failing to secure the decryption key results in even the most advanced encryption scheme failing to provide security. Once the decryption key is available all of the encrypted data falls prey to prying eyes.

Accordingly, there is a need in the art for a system and method that provides for the encryption and decryption of computer system information, while providing a decryption key that is capable of being secured with very limited access.

Thus, it is a primary object of the present invention to provide a system and method for the generation, storage and retrieval of cryptographic keys that provides a decryption key capable of being secured with very limited access.

SUMMARY OF THE INVENTION

In the attainment of the primary object, the present invention is embodied within a processor-based system. A portable memory device is provided for seeding an encryption key generation algorithm and for storing the resulting generated keys. This device is interfacable with the processor-based system and, once interfaced, the user may invoke the processor-based system to cause at least one cryptographic key set to be generated. The cryptographic key set so generated includes at least one encryption key k1 and at least one decryption key k2 and are stored to the portable memory device. Additionally, any encryption keys k1 so generated are stored to a storage device within the processor-based system. Thereafter, the portable memory device may be removed from the interface and stored safely away, thus providing very limited access to any decryption keys k2 generated.

Once an encryption key k1 is generated by the present invention, this key may be utilized to encrypt any number of data files or other information stored on a storage device within the processor-based system, or any other suitable information storage system, with the knowledge that the decryption key k1 is available to only those allowed physical access to the portable memory device. Thereafter, any such encrypted files may only be decrypted in a processor-based system wherein the portable memory device containing the correct decryption key k2 is interfaced.

In a preferred embodiment of the present invention, the processor-based system is a personal computer ("PC"). The PC is capable of executing a program, hereinafter referred to as the "Key Generation Program," which reads unique information from the portable memory device and, in combination with information found on the PC, generates at least one cryptographic key set.

The above mentioned generated cryptographic key set will ideally be utilized by an encryption and decryption means, such means being suitable for encrypting or decrypting desired information. In a preferred embodiment of the present invention, the encryption and decryption means are in the form of a computer program suitable for execution on a processor-based system. It shall be understood that such encryption and decryption means and corresponding keys may be utilized on processor-based systems in addition to the processor-based system upon which the keys were generated. Although it will be understood that both the encryption and decryption means may be accomplished by separate programs, the combination of both will hereinafter be referred to as the "Cryptographic Program." It will also be understood that the Key Generation Program and Cryptographic Program may be embodied as separate modules of one program.

In a preferred embodiment of the present invention, a touch memory ("TM") button, manufactured by, for example, Dallas Semiconductor, Dallas, Tex., is utilized as the portable memory device. TM buttons may not only be utilized to provide seed information for key generation and key storage, as in the preferred embodiment, but may also include key generation algorithms. In this alternative embodiment, the Key Generation Program operates within the TM button, with the host PC enabling its operation by supplying certain information.

An advantage of using TM buttons is their utilization of a special receiving apparatus to allow data communication between the TM button and a processor-based system. Such TM button receiving apparatuses are not common to most processor-based systems in use today. Thus, a form of security is provided since only processor-based systems capable of data communication with TM buttons are capable of accessing the decryption key.

Typically, different TM buttons will be utilized in the same system for different security access requirements. The secured user will physically carry the TM button containing a desired decryption key to the processor-based system, wherein the decryption key is to be input, and couple the button to a corresponding receiving apparatus coupled to the processor-based system. Once coupled, the decryption key may be downloaded to the decryption means. It will be understood that the processor-based system to which the button is coupled may be physically remote from the processor-based system wherein the decryption means actually decrypts the desired information. Such remote decryption key access may be provided by computer network, telecommunications, or the like.

In yet another alternative embodiment of the present invention, the aforementioned TM buttons are specially manufactured by Dallas Semiconductor for use in conjunction with Key Generation Programs, i.e., unique serial numbers specific to the Key Generation Program are embedded within each TM button. These serial numbers are then utilized by the Key Generation Program in the generation of the encryption and decryption keys after verifying them against the serial number of the Key Generation Program. Thus, a form of security is provided since only the TM buttons specially manufactured for use with the Key Generation Program may be utilized to generate encryption and decryption keys for use with a particular Key Generation Program.

In another alternative embodiment of the present invention, any decryption key k2 generated by the system is stored on multiple ones of the portable memory device. Such copies of the decryption key providing redundant keys for use upon failure or misplacing of a primary decryption key. The multiple decryption keys k also providing more than one secured user access to the encrypted files.

In still another alternative embodiment of the present invention, different portions of any single decryption key k2 generated by the system are stored on multiple ones of the portable memory device. The breaking up of the decryption key provides additional security as multiple ones of the portable memory device, presumably held by different secured users, are required at the time of decryption of information encrypted with a corresponding encryption key.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
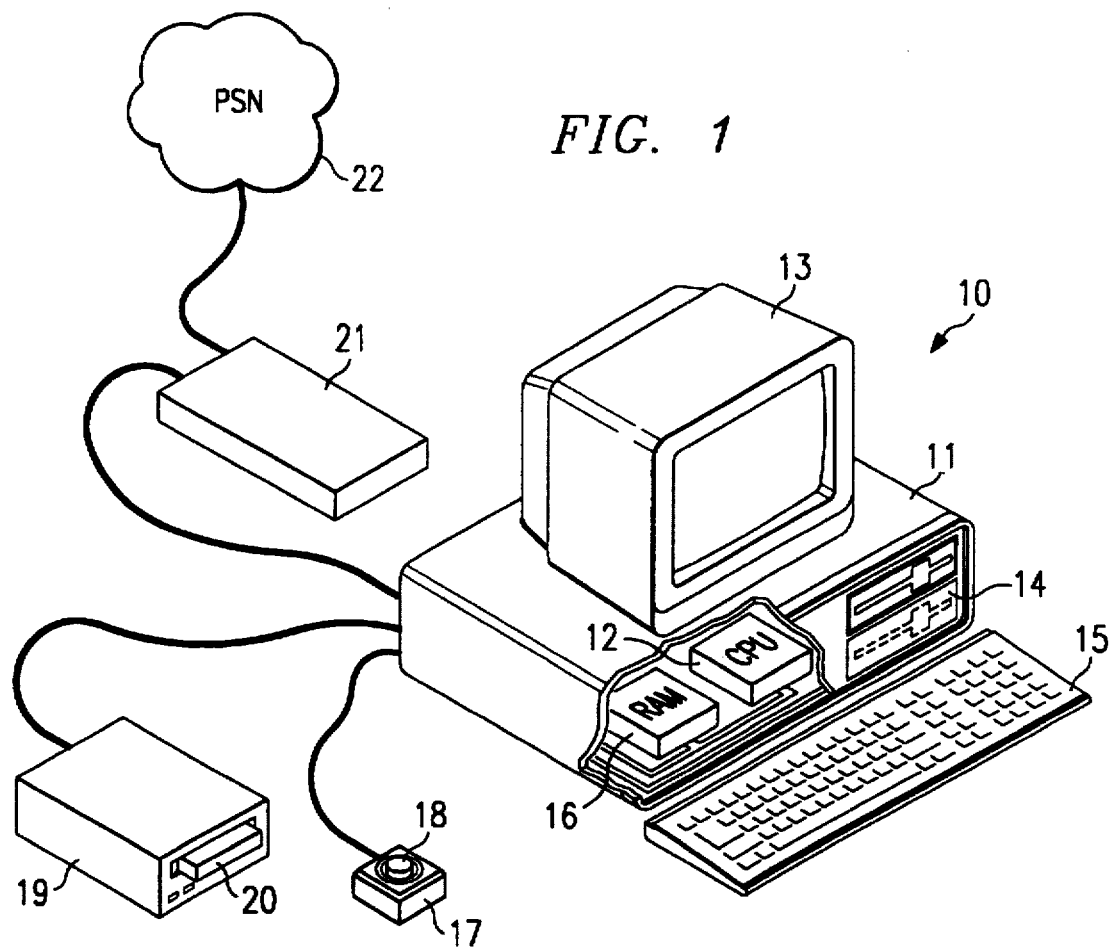
FIG. 1 illustrates a processor-based system 10 for implementation of the present invention.

Referring to FIG. 1, there is illustrated a preferred embodiment of processor-based system 10 utilized for implementing the present invention. System 10 includes chassis 11 enclosing processor ("CPU") 12, memory device ("RAM") 16 and storage device 14. Coupled to CPU 12 is display 13 and keyboard 15. Furthermore, system 10 is adapted for coupling with conventional Touch Memory ("TM") button 18, shown engaged with button holder 17. In a preferred embodiment, system 10 is a personal computer ("PC"). In an alternative embodiment, system 10 could be part of a main-frame computer or system 10 could be part of a networked system of processor-based systems.

TM button 18 is available from Dallas Semiconductor, Dallas, Tex. In a preferred embodiment of the present invention a batch of TM buttons will be manufactured with specifically designated serial numbers for use solely with the present invention.

A single system 10 may be employed to utilize all aspects of the present invention. In example, system 10 may be employed to generate the cryptographic keys, storing the decryption and encryption keys on TM button 18 while placed in button holder 17 and the encryption key on storage device 14. Subsequently, system 10 could be utilized to encrypt data using the encryption key stored on storage device 14 without any need for the further presence of TM button 18 in button holder 17. The encrypted data may be stored on tape media 20 inserted in tape drive 19. At still a later time, system 10 may be employed to decrypt the data so encrypted, using the decryption key stored on TM button 18 as read from the TM button 18 while placed in button holder 17 at some point in the decryption process.

Alternatively, multiple systems 10 may be employed to utilize the aspects of the present invention. A first system 10 may be employed to generate the cryptographic keys, storing the generated decryption and encryption keys on TM button 18 while placed in button holder 17 at some point in the generation process. A second system 10 may be utilized to encrypt data using the encryption key generated by the first system 10. The encryption key may be transferred to the second system 10 from the TM button 18 after being placed in button holder 17 at some point prior to, or during, the encryption process. Subsequently, a third system 10 may be employed to decrypt the data encrypted by the second system 10. The third system 10 could utilize the decryption key generated by the first system 10 as read by the third system 10 from the TM button 18 while placed in button holder 17 at some point during the decryption process.

Additionally, a pair of systems 10 may be linked together through Public Switched Network ("PSN") 22 via modem 21 or directly through digital telecommunications trunks or network system (not shown). The linking of a pair of systems 10 could be utilized to decrypt data at a local system 10 accessing a decryption key located at a remote system 10. Such remote decryption key access being accomplished by the local system 10 reading the decryption key from TM button 18 placed in button holder 17 at the remote system 10 at some point in the decryption process. The system could be designed such that decryption can occur only by using the same button 18 with the same processor (by matching several numbers), only by a processor running special application program or by any PC whatsoever.

Figure 2:
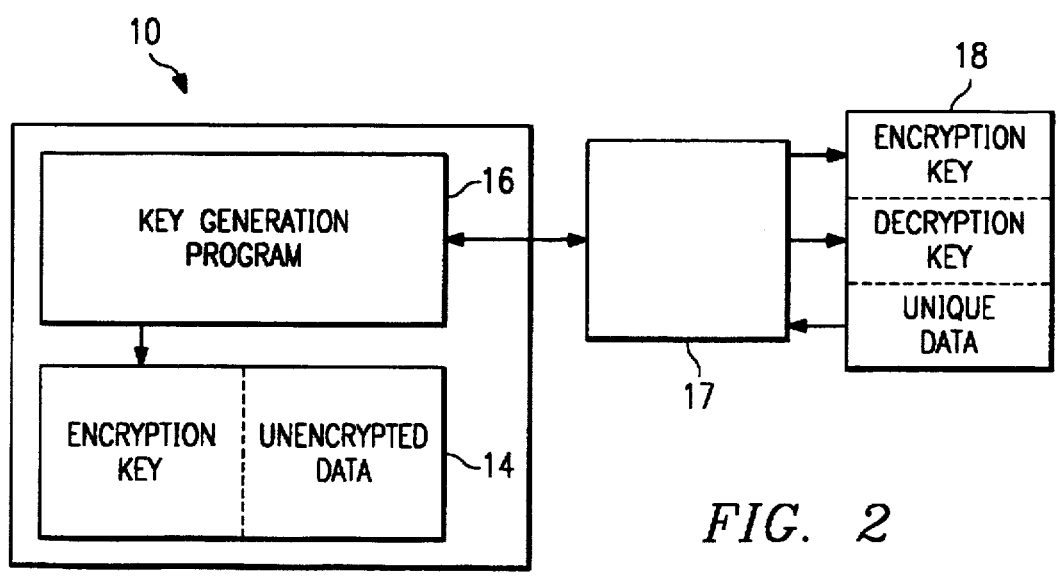
FIG. 2 illustrates a schematic block diagram of the key generation process of a preferred embodiment of the present invention within processor-based system 10.

Referring to FIG. 2, there is illustrated a schematic block diagram of the cryptographic key generation process of the claimed invention on processor-based system 10. It shall be appreciated, although in a preferred embodiment a key generation algorithm is operable on system 10, that TM button 18 may itself include the key generation algorithm. An advantage of such an alternative embodiment is that it provides a very secure environment in which the cryptographic key sets of the present invention may be generated.

Figure 5:
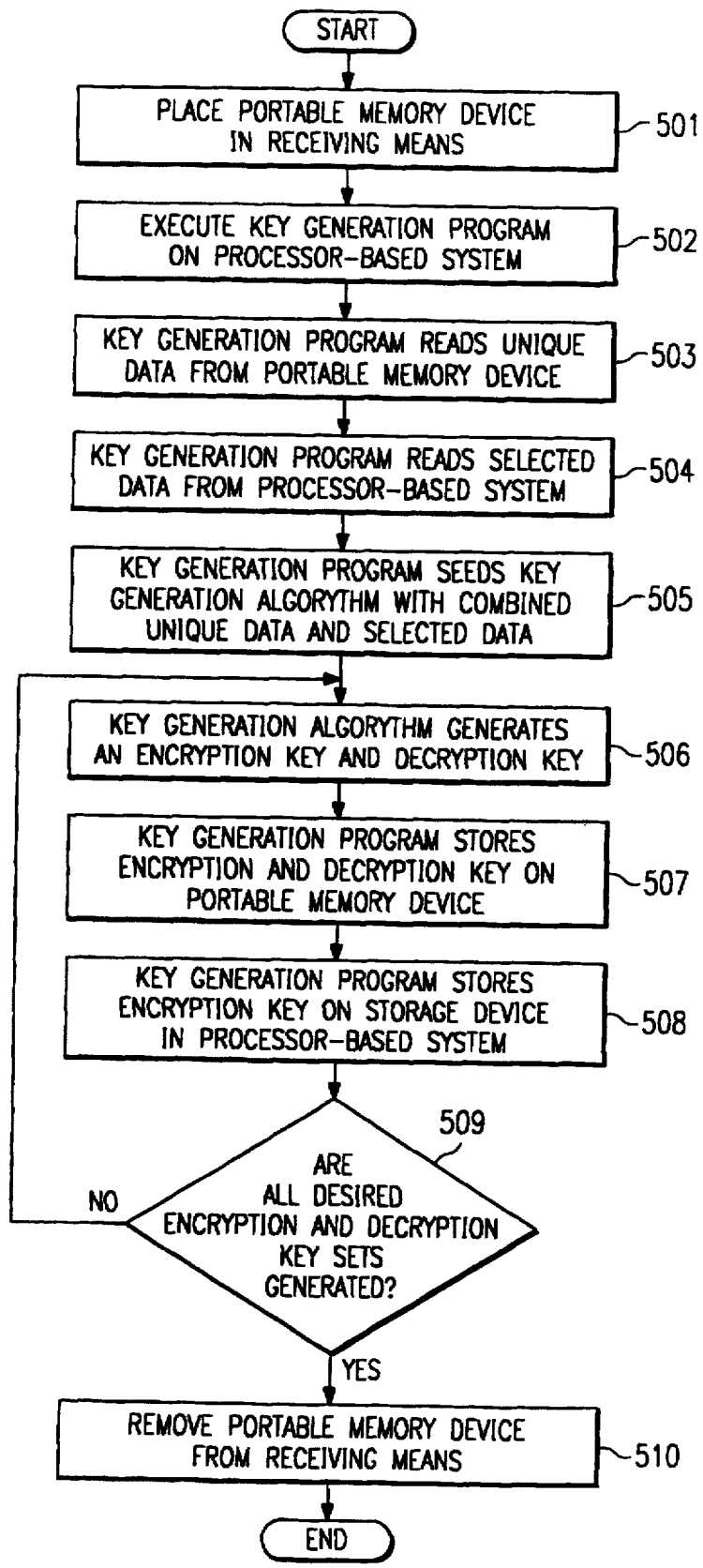
FIG. 5 illustrates a flow diagram of the key generation process.

Directing attention to FIG. 5, a flow diagram is illustrated depicting the individual steps involved in generating cryptographic keys utilizing the claimed invention. In utilizing the present invention, TM button 18 is placed in button holder 17 (step 501). The Key Generation Program is started on system 10 (step 502). It shall be understood that steps 501 and 502 are not shown in this sequence because of any limitation, and may be performed in any order with respect to each other.

It shall be appreciated that in an alternative embodiment where the Key Generation Program is contained within TM button 18, at step 502, system 10 merely indicates a desire to generate a cryptographic key set by communicating predetermined information to TM button 18. This information may include information specific to system 10 to be utilized in seeding a randomizer contained within TM button 18.

At step 503, the Key Generation Program reads unique data contained within TM button 18. Additionally, the Key Generation Program reads selected data from system 10 (step 504). This selected data may be such data as a serial number or current date and time. It shall be understood that steps 503 and 504 are not illustrated in this sequence because of any limitation, and may also be performed in any order with respect to each other. In a preferred embodiment of the present invention the Key Generation Program may verify the contents of the unique data against similar data within the Key Generation Program, or stored within system 10, to allow cryptographic key generation only with a select few combinations of particular TM buttons 18 and systems 10.

The Key Generation Program combines the unique data read in step 503 with the selected data read in step 504 and uses this combined data to seed a random sequence generator utilized by the Key Generation Program (step 505). Thereafter, the Key Generation Program generates at least one cryptographic key set based on the result of the seeding of the random sequence generator with the combined data (step 506). It shall be understood that, although the seeded randomizer is utilized in a preferred embodiment of the present invention, any cryptographic key algorithm utilizing, or adaptable to utilize, a seed data string could be used.

Upon generation, the Key Generation Program stores the encryption and decryption keys to TM button 18 held in button holder 17 (step 507). The Key Generation Program may also store an index indicating the association of particular encryption and decryption keys if desired. It will be appreciated that such an index, or other method of identifying associated cryptographic keys, is advantageous where a plurality of cryptographic key sets are to be generated and stored to TM button 18. Such an index may be utilized to later aid in determining the proper decryption key with which to decrypt a file encrypted with any one of the generated encryption keys. Furthermore, such an index may be stored to storage media 14 located within system 10 for indicating the proper decryption key with which to decrypt a file encrypted with any one of the generated encryption keys.

At step 508, the Key Generation Program also stores the generated encryption key to storage media 14 located within system 10. Of course, storage of the generated encryption key within system 10 may be omitted if desired. It shall be understood that steps 507 and 508 are not illustrated in this sequence because of any limitation, and may be performed in any order with respect to each other.

In an alternative embodiment of the present invention, the Key Generation Program will determine if it is desired that the cryptographic keys generated be stored on multiple ones of TM button 18. The storage of multiple copies of the cryptographic keys allows for multiple persons to have equal access to any data encrypted with the encryption key as well as providing a replacement key in case of loss.

In another alternative embodiment, the Key Generation Program will determine if it is desired that portions of the same decryption key be separated and stored on multiple ones of TM button 18. The fragmentation of the decryption key and its subsequent storage on multiple portable memory devices allows for added security in that more than one TM button 18, presumably possessed by more than one person, must be present at the time of decryption.

At step 509, the Key Generation Program determines if all desired cryptographic key sets have been generated. If it is desired that more sets of cryptographic keys be generated, Key Generation Program returns to step 506 to continue the generation process. If no additional cryptographic key sets are desired, TM button 18 may be removed from button holder 17 (step 510) and the process terminated.

Figure 3:
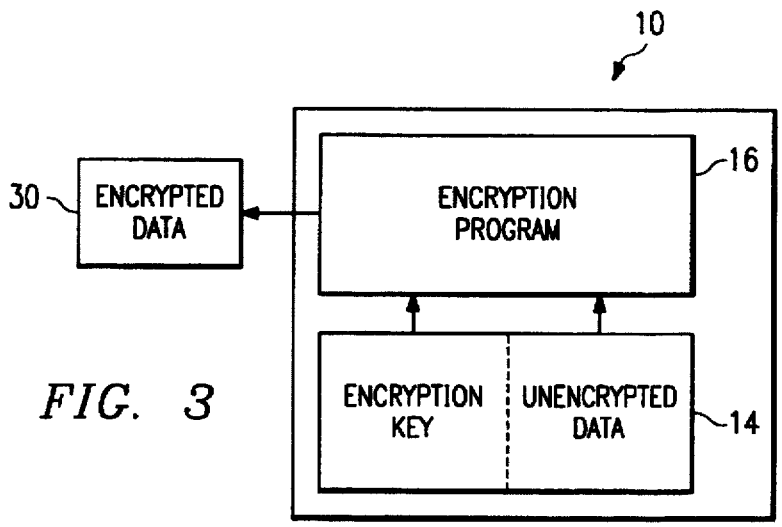
FIG. 3 illustrates a schematic block diagram of the encryption of data of the present invention within processor-based system 10.
Figure 6:
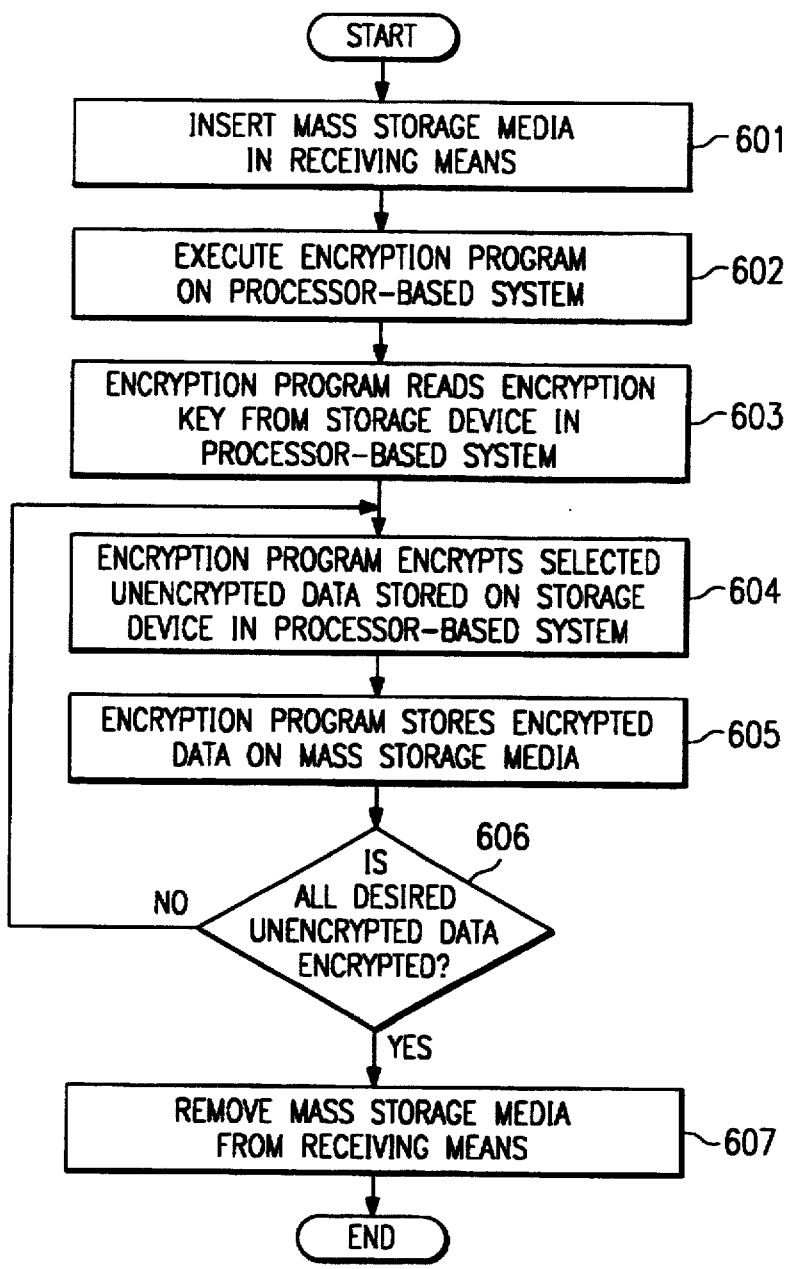
FIG. 6 illustrates a flow diagram of the encryption process.

Now referring to FIG. 3, there is illustrated a schematic block diagram of the data encryption process of the claimed invention on processor-based system 10. Directing attention to FIG. 6, a flow diagram is illustrated depicting the individual steps involved in data encryption utilizing the claimed invention.

In utilizing the present invention, tape media 20 is inserted in tape drive 19 (step 601). The Cryptographic Program is started on system 10 (step 602). It shall be understood that steps 601 and 602 are not shown in this sequence because of any limitation, and may be performed in any order with respect to each other.

It will be understood that, although tape media is disclosed in a preferred embodiment of the present invention, any number of media may be so utilized. In an alternative embodiment of the present invention, storage device 14 is utilized in place of tape media 20 and tape drive 19. In another alternative embodiment of the present invention, system 10 is connected to a second system 10 through PSN 22 via modem 21 or directly through digital telecommunications trunks or a network system (not shown). In such an arrangement, storage device 14 of the second system 10 could be utilized in place of tape media 20 and tape drive 19.

At step 603, the Cryptographic Program reads the encryption key from storage media 14. It shall be understood that in an alternative embodiment of the present invention, where the encryption key has not been stored on storage device 14, step 603 involves reading the encryption key from TM button 18 placed in button holder 17.

Upon reading the encryption key, the Cryptographic Program encrypts selected data stored on storage device 14 (step 604). Encryption is accomplished according to an encryption algorithm within the Cryptographic Program. Preferably the Cryptographic Program encryption algorithm conforms to the ANSI X3.92 standard. Subsequent to encryption, the Cryptographic Program stores the encrypted data on tape media 20 (step 605). It should be understood that, in the alternative embodiments discussed above, the Cryptographic Program may store the encrypted data to a storage means other than tape 20. As previously discussed, the storage means may be local or linked to system 10 through PSN 22 via modem 21 or directly through digital telecommunications trunks or network system (not shown).

In an alternative embodiment, the Cryptographic Program associates information, suitable for later enabling the Cryptographic Program to identify a proper decryption key to utilize when decrypting the encrypted data, with the encrypted data. Such associated information may, for example, be a data string attached to the encrypted data or information stored separate from the encrypted data. The association information may include the encryption key, or identification of same, utilized in the encryption process or may be information identifying the decryption key required to decrypt the data as indicated by an index of such keys stored on storage media 14.

After encrypting data, at step 606 the Cryptographic Program determines if all desired data has been encrypted. If it is desired that more data be encrypted, Cryptographic Program returns to step 604 to continue the encryption process. If no additional data is to be encrypted, tape media 20 may be removed from tape drive 19 (step 607) and the process terminated.

Figure 4:
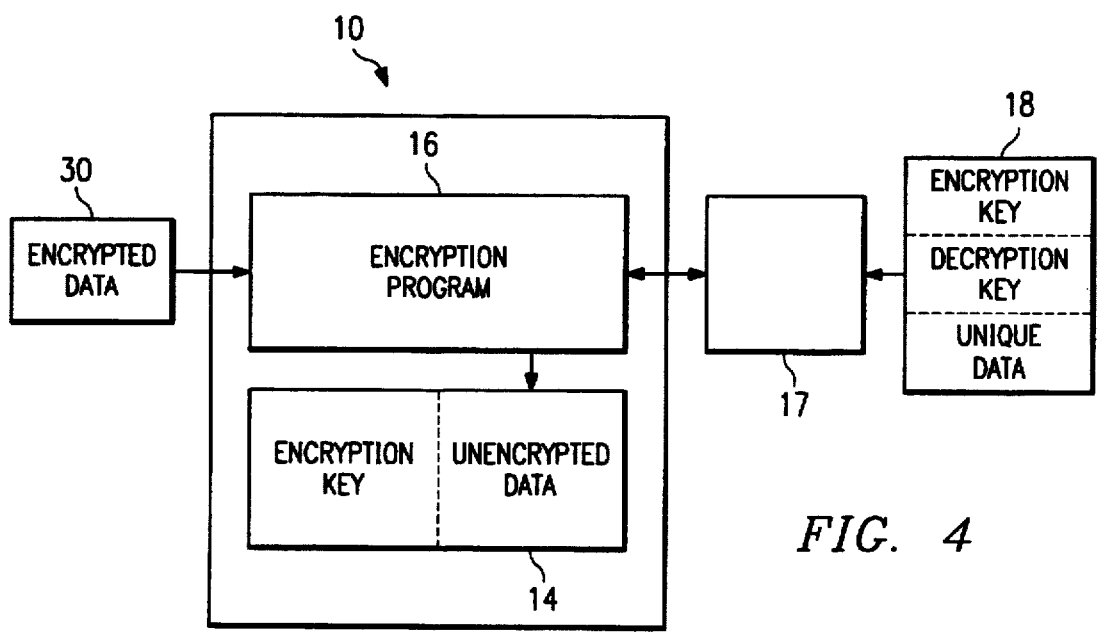
FIG. 4 illustrates a schematic block diagram of the decryption of encrypted data of the present invention within processor-based system 10.
Figure 7:
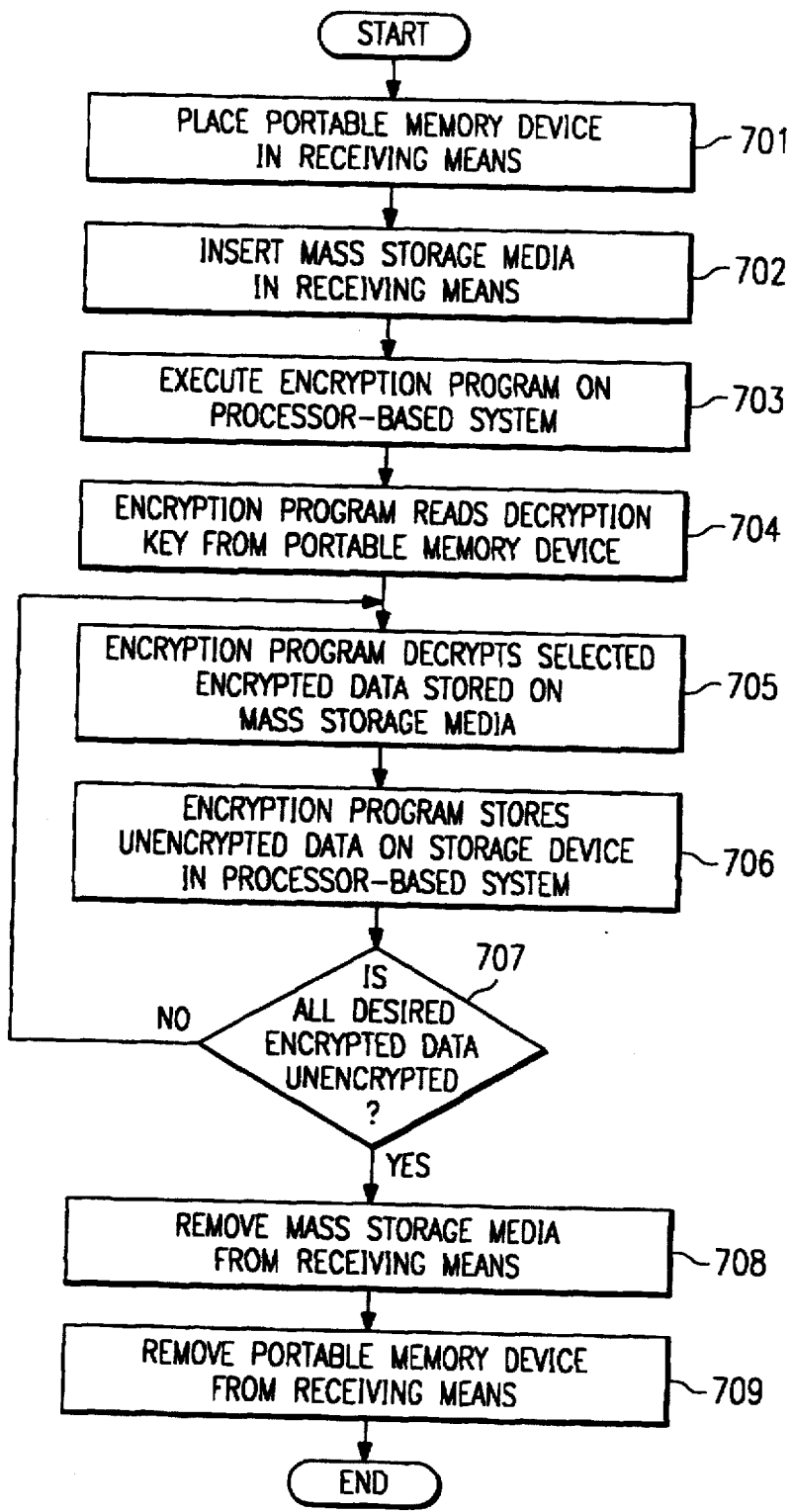
FIG. 7 illustrates a flow diagram of the decryption process.

Now referring to FIG. 4, there is illustrated a schematic block diagram of the data decryption process of the claimed invention on processor-based system 10. Directing attention to FIG. 7, a flow diagram is illustrated depicting the individual steps involved in data decryption utilizing the claimed invention.

In utilizing the present invention, TM button 18 is placed in button holder 17 (step 701) and tape media 20 is inserted in tape drive 19 (step 702). In step 703 the Cryptographic Program is started on system 10. It shall be understood that steps 701, 702 and 703 are not shown in this sequence because of any limitation, and may be performed in any order with respect to one another.

It will be understood that, although tape media is disclosed in a preferred embodiment of the present invention, any number of media may be so utilized. In an alternative preferred embodiment of the present invention, storage device 14 is utilized in place of tape media 20 and tape drive 19. In another alternative embodiment of the present invention, system 10 may be connected to a second system 10 through PSN 22 via modem 21 or directly through digital telecommunications trunks or a network system (not shown). In such an arrangement, storage device 14 of the second system 10 is utilized in place of tape media 20 and tape drive 19.

At step 704 the Cryptographic Program reads the decryption key from TM button 18 placed in button holder 17. It should be noted that in the alternative embodiment wherein the decryption key is divided and stored on multiple ones of TM button 18, the Cryptographic Program will read a portion of the decryption key from each such TM button 18.

As discussed above, in an alternative embodiment the Cryptographic Program associates information with the encrypted data to enable the later identification of a particular decryption key with which to decrypt the data. It will be appreciated that in such an embodiment the step of reading the decryption key from TM button 18 includes the additional substep of utilizing this associated information to identify the particular decryption key to read from TM button 18.

In step 705, the decryption key is utilized by the Cryptographic Program to decrypt selected encrypted data stored on tape media 20. In alternative embodiments of the present invention, as discussed above, the Cryptographic Program may read the encrypted data from a remote mass storage means linked to system 10 through PSN 22 via modem 21 or directly through digital telecommunications trunks or network system (not shown). Decryption of the encrypted data is accomplished by an algorithm within the Cryptographic Program. Preferably the Cryptographic Program decryption algorithm conforms to the ANSI X3.92 standard.

Upon decryption, the decrypted data is stored on storage device 14 in system 10 (step 706).

At step 707, the Cryptographic Program determines if all desired encrypted data has been decrypted. If it is desired that more encrypted data be decrypted, the Cryptographic Program returns to step 705 to continue the decryption process. If no additional encrypted data is to be decrypted, tape media 20 may be removed from tape drive 19 (step 708), TM button 18 may be removed from button holder 17, and the process terminated.

The aforementioned Key Generation and Cryptographic Programs have been shown and described with respect to operating on a PC or alternatively on a TM button. Of course, other means could be employed for implementing the present invention within a variety or combination of processor-based systems.

Also note that, while the portable memory device has been shown to be a "button" memory, any memory device having the capability to be prewritten with unique data, leaving free some residual data capability, will work. Since unique data can be stored on a standard "diskette" such a memory device may be used if desired.

Although the present invention and its advantages have been described in detail, it should be understood that various changes, substitutions and alterations can be made herein without departing from the spirit and scope of the invention as defined by the appended claims.

What is claimed is:

1. A processor-based system for generating, storing, and retrieving cryptographic keys, said system comprising:

means for removably coupling a portable memory to said system thereby providing a coupled portable memory, said coupling means providing data communication between said coupled portable memory and said system;

means for reading information from a portable memory removably coupled to said system thereby providing read information, said read information being unique to said coupled portable memory;

means for selecting information within said system;

means for combining said read information with said selected information, said combined information being a single data string;

means for generating at least one cryptographic key set utilizing said combined information, said cryptographic key set comprising at least one encryption key and at least one decryption key;

means for storing said cryptographic key set in said coupled portable memory removably coupled to said system;

means for storing said encryption key in a data storage means within said system;

means for encrypting selected information utilizing said encryption key;

means for reading said decryption key from said coupled portable memory removably coupled to said system; and means for decrypting said encrypted information utilizing said decryption key read from said coupled portable memory.

2. The system as recited in claim 1 wherein said means for storing said cryptographic key set comprises:

means for storing said cryptographic key set in multiple ones of said portable memory, said multiple ones of said portable memory being removably coupled to said system sequentially.

3. The system as recited in claim 1 wherein said means for storing said cryptographic key set comprises:

means for dividing said generated decryption key into a plurality of fragments, said plurality of fragments being capable of unification to form said generated decryption key; and means for storing said plurality of fragments in a plurality of said portable memory, ones of said plurality of said portable memory each storing only a portion of said plurality of fragments, said plurality of said portable memory being removably coupled to said system sequentially.

4. The system as recited in claim 3 wherein said means for reading said decryption key comprises:

means for reading said plurality of fragments from said plurality of said portable memory, ones of said plurality of said portable memory each storing only a portion of said decryption key, said plurality of said portable memory being removably coupled to said system sequentially; and means for unifying said read plurality of fragments into said decryption key.

5. The system as recited in claim 1 further comprising:

means for storing said encrypted data in a remote storage apparatus, said remote storage apparatus being in temporary data communication with said system.

6. The system as recited in claim 1 further comprising:

means for reading said encrypted data from a remote storage apparatus, said remote storage apparatus being in temporary data communication with said system.

7. The system as recited in claim 1 wherein said means for reading said decryption key comprises:

means for reading said generated decryption key from a second processor-based system, said second system being in data communication with said system, said portable memory being removably coupled to said second system.

8. The system as recited in claim 1 wherein said portable memory is a TM button.

9. In combination with a processor-based system, a method for generating, storing, and retrieving encryption and decryption keys, said method comprising the steps of:

removably coupling a portable memory device to said system thereby providing a removably coupled portable memory device so as to provide data communication between said removably coupled portable memory device and said system;

reading information from said removably coupled portable memory device, said read information being unique to said portable memory device;

selecting information within said system;

combining said read information with said selected information, said combined information being a single data string;

generating at least one cryptographic key set utilizing said combined information, said cryptographic key set comprising at least one encryption key and at least one decryption key;

storing said decryption key in said removably coupled portable memory device;

storing said encryption key in a data storage means within said system;

encrypting selected information utilizing said encryption key;

reading said decryption key from said portable memory device; and decrypting said encrypted information utilizing said decryption key read from said portable memory device.

10. The method as recited in claim 9 wherein said step of storing said decryption key comprises the step of:

storing said decryption key in multiple ones of said portable memory device, said multiple ones of said portable memory device being removably coupled to said system sequentially.

11. The method as recited in claim 9 wherein said step of storing said decryption key comprises the steps of:

dividing said generated decryption key into a plurality of fragments, said plurality of fragments being capable of unification to form said generated decryption key; and storing said plurality of fragments in a plurality of said portable memory devices, ones of said plurality of portable memory devices each storing only a portion of said plurality of fragments, said plurality of said portable memory devices being removably coupled to said system sequentially.

12. The system as recited in claim 11 wherein said step of reading a decryption key comprises the steps of:

reading said plurality of fragments from said plurality of said portable memory devices, ones of said plurality of said portable memory devices each storing only a portion of said decryption key, said plurality of said memory devices being removably coupled to said system sequentially; and unifying said read plurality of fragments into said decryption key.

13. The method as recited in claim 9 further comprising the step of:

storing said encrypted data in a remote storage apparatus, said remote storage apparatus being in temporary data communication with said system.

14. The method as recited in claim 9 further comprising the step of:

reading said encrypted data from a remote storage apparatus, said remote storage apparatus being in temporary data communication with said system.

15. The method as recited in claim 9 wherein said step of reading said decryption key comprises the step of:

reading said generated decryption key from a second processor-based system, said second system being in data communication with said system, said second system being removably coupled to said portable memory device.

16. A system for generating and storing cryptographic keys, said system comprising:

means for removably coupling a portable memory device to said system to provide a coupled portable memory device when a portable memory is coupled to said coupling means, said coupling means providing data communication between said coupled portable memory device and said system;

means for reading information from said coupled portable memory device, said read information being unique to said coupled portable memory device;

means for generating at least one cryptographic key set utilizing said read information, said cryptographic key set comprising at least one encryption key and at least one decryption key; and means for storing said decryption key in said coupled portable memory device removably coupled to said system.

17. The system as recited in claim 16 wherein said portable memory device is a TM button.

18. The system as recited in claim 16 wherein said means for storing said decryption key comprises:

means for storing said decryption key in multiple ones of said portable memory device, said multiple ones of said portable memory device being removably coupled to said system sequentially.

19. The system as recited in claim 16 wherein said means for storing said decryption key comprises:

means for dividing said generated decryption key into a plurality of fragments, said plurality of fragments being capable of unification to form said generated decryption key; and means for storing said plurality of fragments in a plurality of said portable memory devices, ones of said plurality of said portable memory devices each storing only a portion of said plurality of fragments, said plurality of said portable memory devices being removably coupled to said system sequentially.

20. The system as recited in claim 16 further comprising:

means for associating said at least one encryption key with said at least one decryption key of said cryptographic key set.

21. A system for retrieving a decryption key pertaining to data previously encrypted with an encryption key, said decryption key and encryption key comprising a cryptographic key set, said system comprising:

a processor;

means for removably coupling a portable memory device to said processor, wherein a removably coupled portable memory device is provided when a portable memory device is coupled to said coupling means, wherein said portable memory device includes a decryption key generated and stored in the portable memory device during a key generation process completed before the portable memory device is removably coupled to said processor for retrieving the decryption key; and means for reading said previously stored decryption key from said removably coupled portable memory device.

22. The system as recited in claim 21 wherein said portable memory device is a TM button.

23. The system as recited in claim 21 wherein said means for reading a decryption key comprises:

means for reading said decryption key from a second system, said second system being in data communication with said system, said portable memory device being removably coupled to said second system.

24. The system as recited in claim 21 wherein said means for reading a decryption key comprises:

means for reading a plurality of fragments from a plurality of said portable memory devices, said plurality of said portable memory devices each storing only a portion of said plurality of fragments, said plurality of said portable memory devices being removably coupled to said system sequentially; and means for unifying said read plurality of fragments into a decryption key.

25. The system as recited in claim 24 wherein said data string comprises information identifying a particular previously stored decryption key with which to decrypt said encrypted data.

26. The system as recited in claim 24 wherein said data string comprises information identifying an encryption key utilized to encrypt said encrypted data.

27. The system as recited in claim 21 wherein said means for reading a decryption key further comprises means for reading a data string associated with said encrypted data, said data string containing information regarding a cryptographic key set utilized to encrypt said encrypted data.

28. A system for retrieving a decryption key pertaining to data previously encrypted with an encryption key, said decryption key and encryption key comprising a cryptographic key set, said system comprising:

a processor;

means for removably coupling a portable memory device to said processor, wherein a removably coupled portable memory device is provided when a portable memory device is coupled to said coupling means; and means for reading a previously stored decryption key from said removably coupled portable memory device, said previously stored decryption key having been generated as part of a cryptographic key set based in part from data unique to a removably coupled memory device.

29. The system as recited in claim 28 wherein said portable memory device is a TM button.

30. The system as recited in claim 28 wherein said means for reading a decryption key comprises:

means for reading said decryption key from a second system, said second system being in data communication with said system, said portable memory device being removably coupled to said second system.

31. The system as recited in claim 28 wherein said means for reading a decryption key further comprises means for reading a data string associated with said encrypted data, said data string containing information regarding a cryptographic key set utilized to encrypt said encrypted data.

* * * * *